United States Patent
Dane

(10) Patent No.: US 6,528,721 B1
(45) Date of Patent: Mar. 4, 2003

(54) AERIAL CONDUCTOR SUSPENSION CLAMP

(76) Inventor: Allan Dane, 11234 - 71 Avenue, Edmonton Alberta (CA), T6G 0A6

( * ) Notice: Subject to any disclaimer, the term of this patent is extended or adjusted under 35 U.S.C. 154(b) by 0 days.

(21) Appl. No.: 09/683,737

(22) Filed: Feb. 7, 2002

(51) Int. Cl.[7] .................................................. H02G 7/00
(52) U.S. Cl. .................. 174/40 R; 248/49; 174/40 CC; 174/42
(58) Field of Search ................ 174/40 R, 40 CC, 174/42, 68.3, 72 C, 74 A, 76, 99 R, 136, 168; 248/49, 58

(56) References Cited

U.S. PATENT DOCUMENTS

| 3,778,527 A | * | 12/1973 | Nigol ........................... 174/42 |
| 4,381,422 A | | 4/1983 | Traini |
| 4,582,373 A | * | 4/1986 | Harmon ........................ 439/33 |
| 6,448,493 B1 | * | 9/2002 | Efraimsson et al. ...... 174/40 R |

FOREIGN PATENT DOCUMENTS

| CA | 1 161 913 | 4/1983 |
| FR | 2749102 | 11/1997 |
| GB | 1 320 893 | 7/1973 |
| JP | 4926315 | 1/1992 |

* cited by examiner

Primary Examiner—Dean A. Reichard
Assistant Examiner—W. David Walkenhorst
(74) Attorney, Agent, or Firm—Bennett Jones LLP

(57) ABSTRACT

An aerial conductor suspension clamp includes a housing, two split PTFE sleeves and a restraining sleeve. The restraining sleeve is bonded to the conductor and is placed within the housing between the split sleeves. The clamp permits rotation of the conductor while restraining longitudinal movement of the conductor within the clamp.

8 Claims, 2 Drawing Sheets

AERIAL CONDUCTOR SUSPENSION CLAMP

BACKGROUND OF INVENTION

The present invention relates to a suspension clamp for aerial electric conductors.

Conductor galloping is a phenomenon observed in aerial transmission lines when high winds are blowing across the conductors. The conductors oscillate at a low frequency, typically 0.5 to 1 Hz, and may reach peak to peak amplitudes of 10 feet or more. Conductor galloping can damage transmission towers and take down power transmission lines.

Conventional suspension clamps and spacer dampers clamp onto the conductor and suspend it from tower crossarms in such a manner that both longitudinal movement and rotation of the conductor is restricted.

It is believed that conductor galloping may be reduced or eliminated if the suspension clamp would allow rotational movement while still preventing longitudinal movement of the conductor. Therefore, there is a need in the art for a suspension clamp which permits rotation of the conductor within the clamp while restricting longitudinal movement.

In Canadian Patent No. 1,161,913 (U.S. Pat. No. 4,381,422) a spacer-damper is disclosed which includes a vice enclosing a roller bearing or sleeve bearing within which the conductor wire rests. In this apparatus, the conductor wire is not firmly fixed within the spacer-damper and a strong longitudinal force may cause the conductor wire to slip within the device. It is necessary to introduce a durable grease into the cavity containing the roller bearing and to provide a gasket seal to protect against the penetration of dust, water or the like. If any portion of the roller bearing or sleeve enclosing the wire is made of a ferromagnetic material such as steel, two additional disadvantages result. First, current in the conducting wire will produce considerable heat in the roller bearing races which may cause its premature failure. Second, the ingress of water may cause corrosion of the aluminum conductor wire as a result of its contact with the steel bearing race.

A similar spacer-damper is disclosed in U.K. Patent No. 1,320,893. In this patent, the conductor wire is clamped within a roller bearing by a resilient rubber member. This spacer also permits rotation of the conductor wire while resisting longitudinal movement. Again, a strong longitudinal force will likely displace the conductor wire within the spacer because of the tenuous hold the spacer has on the conductor wire through the resilient rubber member. Also, the bearings may overheat and fail as a result of current being conducted through the conductor wire and the ingress of dust particles.

It is also a concern with this prior art using roller bearings that the bearing races must be constructed in split halves in order to be placed around the wire, which adds complexity and expense to the device.

Therefore, there is a need in the art for a suspension clamp which mitigates the problems in the prior art.

SUMMARY OF INVENTION

The present invention is directed to a suspension clamp for aerial power transmission conductors. In one aspect of the invention, the invention comprises a clamp for suspending an aerial conductor, said clamp comprising:

(a) a clamshell housing which, when closed, defines an elongate central cavity and which defines two end openings on either side of the central cavity wherein said end openings have a smaller diameter than the central cavity and wherein the conductor may pass through both openings and the central cavity;

(b) two split sleeves each of which fit within the central cavity and each of which has an inside diameter slightly greater than or closely matching the outside diameter of the conductor wherein said split sleeves abut the ends of the central cavity when installed on the conductor; and (c) a restraining sleeve which, when affixed to the conductor, fits within the central cavity, between the split sleeves and which has an outside diameter greater than the inside diameter of the split sleeve assemblies and less than the inside diameter of the central cavity;

(d) wherein the conductor may be placed within the central cavity housing such that the restraining sleeve is disposed between and restrained by the two split sleeve assemblies and the conductor passes through the said split sleeves and the end openings.

The split sleeve assemblies preferably comprise a low-friction material such as polytetrafluoroethylene. The retaining sleeve may be a compression repair sleeve which is attached to the conductor by implosion or by hydraulic press.

In another aspect of the invention, the invention comprises a deadend clamp for suspending an aerial conductor comprising:

(a) a deadend housing defining a central bore and having an internal shoulder defining an opening; and (b) a terminal connector having an enlarged end which fits within the deadend housing and rests against the shoulder and an elongate end which passes through the opening;

(c) wherein the enlarged end of the terminal connector bears against and is retained by the shoulder but may still rotate within the housing and wherein the elongate end of the terminal connector may be attached to a terminal end of the aerial conductor.

The deadend clamp may preferably further comprise a thrust bearing disposed between the enlarged end of the terminal connector. Preferably, the deadend housing defines a cylindrical central bore and the enlarged end of the terminal connector is a substantially flat disk.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

Figure 1:
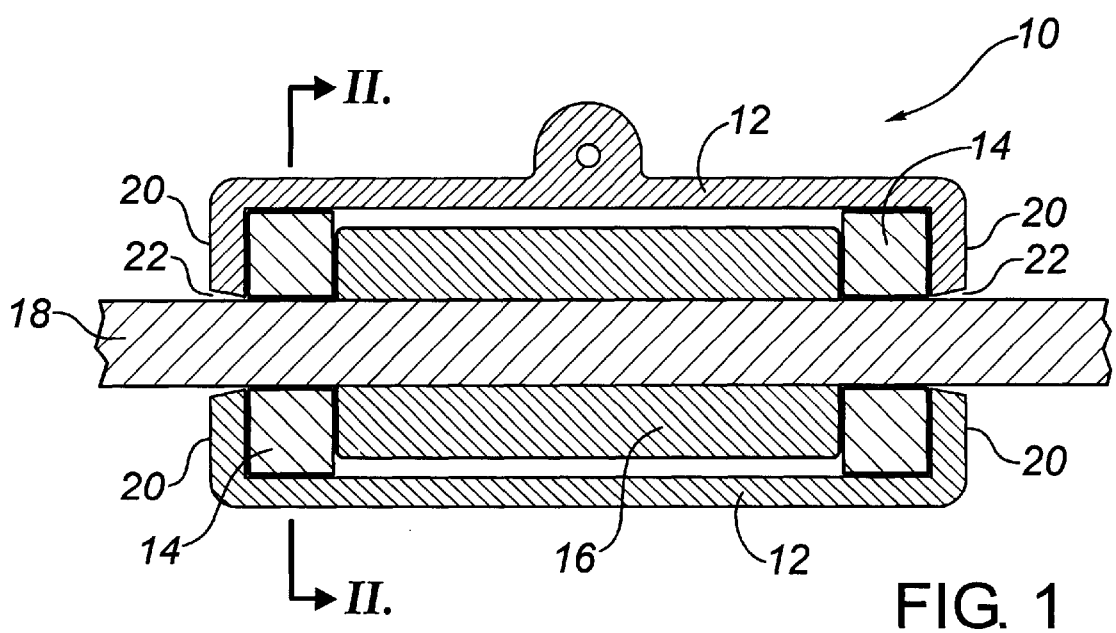
FIG. 1 is a longitudinal cross-section through a suspension clamp of the present invention showing the installation of the clamp onto a conductor.

The apparatus (10) according to the Figures comprises a body shell housing (12) a pair of split collars (14) and a restraining sleeve (16) which is bonded to the conductor (18). The body shell housing (12) includes a tab (13) defining a bolt hole (15) which is used to permanently affix the apparatus from the cross arms of a transmission tower.

Figure 2:
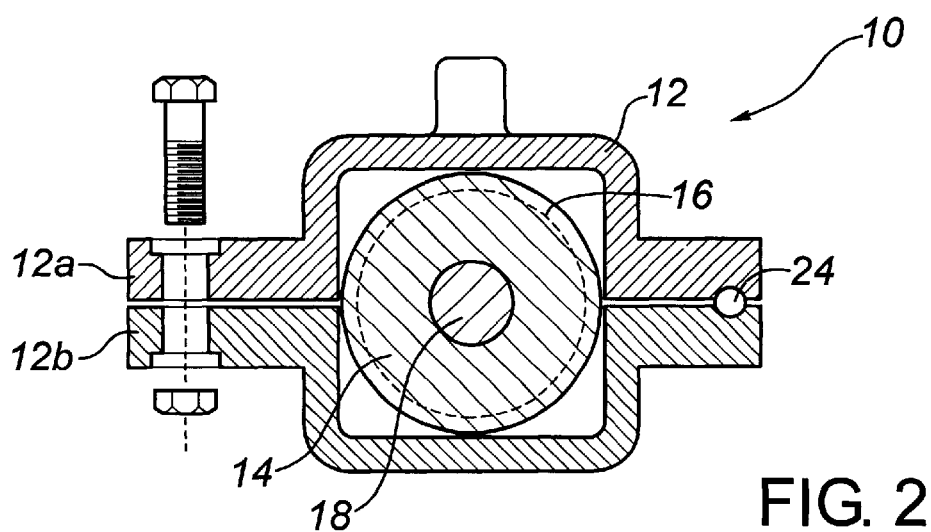
FIG. 2 is a transverse cross-section of the clamp of FIG. 1.

In one embodiment, the housing (12) is cylindrical and hollow, having closed ends (20) which define conductor openings (22). The housing (12) opens clamshell style as it is comprised of two pieces hinged (24) at one side as shown in FIG. 2. Once assembled, the housing (12) is bolted shut through flanges (12a, 12b). It is preferable that the housing be made from aluminum. The collars (14) are split collars which preferably fits loosely around the conductor (18), permitting the conductor (18) to rotate within the housing (12) along its longitudinal axis. If the collars (14) fits tightly around the conductor (18), the collars (14) themselves must freely rotate within the housing (12). The collars are preferably made from or coated with a low-friction material such as polytetrafluoroethylene.

The restraining sleeve (16) is tightly bonded to the conductor (18) and has a length which is slightly less than the distance between the two collars (14), as is shown in FIG. 1. As is readily apparent, the restraining sleeve (16) will then abut both collars (14) and therefore is restrained from moving longitudinally within the housing (12). As a result, the conductor (18) cannot move longitudinally within the housing (12). The restraining sleeve (16) may rotate within the housing (12) provided that its outside diameter is less than the inside diameter of the housing (12) and that there is not excessive friction between the restraining sleeves and one or both of the collars (14). As referred to above, such friction may be minimized by making the collars (14) from a low-friction material or coating the collars with a low-friction material.

The restraining sleeve (16) may be a compression repair sleeve as is well known in the art. Such compression repair sleeves may be press-fit onto the conductor (18) using a hydraulic press or by implosion joining. Any structure which clamps onto the conductor (18) and has sufficient structural strength to restrict longitudinal movement between the collars (14) may be suitable as a restraining sleeve (16) for the present invention. It is preferable for the outside diameter of the sleeve (16) to be less than the inside diameter of the housing (12) to allow for free rotation within the housing (16). It is preferable for the restraining sleeve to be made from aluminum.

The embodiment depicted in the figures and described above may be assembled by first bonding the restraining sleeve (16) onto the conductor (18). The conductor/restraining sleeve combination may then be placed within the opened housing (12) and fitted into one-half of each of the split collars (14). The remaining half of each of the split collars (14) may then be placed onto the conductor (18) and the housing (12) closed around the assembly and bolted shut.

The terminal end (30) of the conductor (18) must also be permitted to rotate. In one embodiment of the invention, the terminal end (30) of the conductor is connected to the deadend device (32) illustrated in FIG. 3. The conductor (18) may have an internally concentric steel reinforcing rod (34) which extends beyond the end of the conductor (18) although not all conductors have this reinforcement (34). The steel reinforcement (34) is inserted into the rod end (36) of a terminal connector (38) which then abuts the end (30) of the conductor (18). A sleeve (40) is placed over the joint and is bonded to both the conductor (18) and the rod end (36) to join the two together. The sleeve (40) may be an aluminum compression sleeve similar to that used in the suspension clamp of the present invention. Its function is to permanently join the conductor (18) to the terminal connector (38). It is not necessary to have a reinforcing rod (34), in which case the terminal end (30) of the conductor (18) is still bonded to the rod end (36) of the terminal connector by the sleeve (40).

Figure 3:
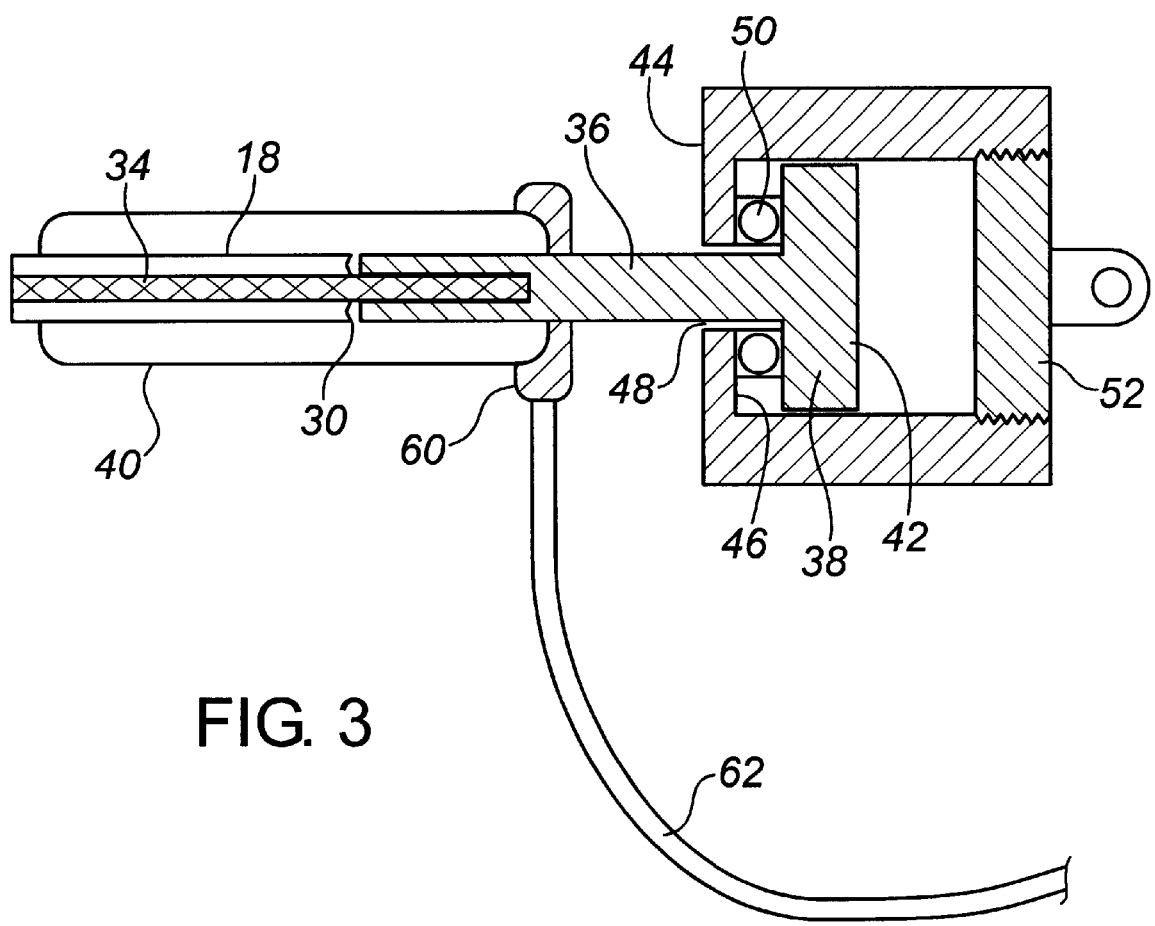
FIG. 3 is a cross-sectional view of a deadend clamp for use with the present invention.

The disk end (42) of the terminal connector (38) is contained within a housing (44) is hollow and cylindrical. One end of the housing (44) defines a shoulder (46) and an opening (48). The rod (36) of the terminal connector (38) passes through the opening (48) while the shoulder (46) retains the disk end (42) within the housing (44). A thrust bearing (50) is provided between the disk end (42) and the shoulder (46) so that the terminal connector (38) may rotate within the housing (44) as the conductor (18) rotates. The open end of the housing (44) may be threaded to a cap (52) which is attached to the tower (not shown) as is shown in FIG. 3.

A conducting terminal pad (60) may be attached to the sleeve (40) and/or to the rod end (36) of the terminal connector which connects to a slack jumper loop (62) to conduct power to the next conductor (18) as is shown schematically in FIG. 4.

As is apparent from the Figures, the conductor (18) may freely rotate because the terminal connector (38) may freely rotate in the deadend housing (44). The thrust bearing (50) permits such rotation even while the conductor (18) is under longitudinal tension.

As will be apparent to those skilled in the art, various modifications, adaptations and variations of the foregoing specific disclosure can be made without departing from the scope of the invention claimed herein.

What is claimed is:

1. A clamp for suspending an aerial conductor from a transmission tower, said clamp comprising:

(a) a clamshell housing which, when closed, defines an elongate central cavity and which defines two end openings on either side of the central cavity wherein said end openings have a smaller diameter than the central cavity and wherein the conductor passes through both openings and the central cavity, said housing comprising a mounting tab for attaching the clamp to the transmission tower;

(b) two split sleeves each of which fit within the central cavity and each of which has an inside diameter slightly greater than or closely matching the outside diameter of the conductor wherein said split sleeves abut the ends of the central cavity when installed on the conductor; and (c) a restraining sleeve which, when affixed to the conductor, fits within the central cavity, between the split sleeves and which has an outside diameter greater than the inside diameter of the spit sleeve assemblies and less than the inside diameter of the central cavity;

(d) wherein the conductor may be placed within the central cavity housing such that the restraining sleeve is disposed between and restrained by the two split sleeve assemblies and the conductor passes through the said split sleeves and the end openings.

2. The clamp of claim 1 wherein the split sleeve assemblies comprise a low-friction material.

3. The clamp of claim 2 wherein the material is polytetrafluoroethylene.

4. The claim of claim 1 wherein the restraining sleeve is attached to the conductor by implosion or by hydraulic press.

5. The clamp of claim 4 wherein the restraining sleeve is an aluminum compression repair sleeve.

6. A deadend clamp for suspending an aerial conductor comprising:

(a) a deadend housing defining a central bore and having an internal shoulder defining an opening;

(b) a terminal connector having an enlarged end which fits within the deadend housing and rests against the shoulder and an elongate end which passes through the opening;

(c) wherein the enlarged end of the terminal conductor bears against and is retained by the shoulder but may still rotate within the housing and wherein the elongate end of the terminal connector may be attached to a terminal end of the aerial conductor; and (d) a thrust bearing disposed between the enlarged end of the terminal connector and the internal shoulder; and (e) wherein the deadend housing defines a cylindrical central bore and the enlarged end of the terminal connector is a substantially flat disk.

7. The deadend clamp of claim 6 further comprising a thrust bearing disposed between the enlarged end of the terminal connector.

8. The deadend clamp of claim 7 wherein the deadend housing defines a cylindrical central bore and the enlarged end of the terminal connector is a substantially flat disk.

* * * * *